US008679703B2

(12) United States Patent
Darling

(10) Patent No.: US 8,679,703 B2
(45) Date of Patent: Mar. 25, 2014

(54) FUEL CELL COMPONENT WITH INTERDIGITATED FLOW FIELDS

(75) Inventor: Robert Mason Darling, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 573 days.

(21) Appl. No.: 12/921,788

(22) PCT Filed: Apr. 18, 2008

(86) PCT No.: PCT/US2008/060777
§ 371 (c)(1),
(2), (4) Date: Sep. 10, 2010

(87) PCT Pub. No.: WO2009/128832
PCT Pub. Date: Oct. 22, 2009

(65) Prior Publication Data
US 2011/0020732 A1    Jan. 27, 2011

(51) Int. Cl.
*H01M 8/04*    (2006.01)
(52) U.S. Cl.
USPC ............................. 429/514; 429/512; 429/513
(58) Field of Classification Search
None
See application file for complete search history.

(56) References Cited

U.S. PATENT DOCUMENTS

| 2001/0004501 | A1  | 6/2001 | Yi et al. |
| 2002/0086200 | A1  | 7/2002 | Margiott |
| 2003/0104267 | A1* | 6/2003 | Haridoss et al. ................ 429/44 |
| 2005/0118485 | A1* | 6/2005 | Tawfik et al. .................. 429/37 |
| 2006/0029855 | A1* | 2/2006 | Ji et al. ............................ 429/34 |

FOREIGN PATENT DOCUMENTS

| CN | 1949571 A |   | 4/2007 |
| JP | 11016591 A |   | 1/1999 |
| JP | 2005116179 A |   | 4/2005 |
| JP | 2006-127770 | * | 5/2006 |
| WO | 2006029318 A2 |   | 3/2006 |

OTHER PUBLICATIONS

Examiner Annotated Figure 12 of Tawfik et al.*
International Preliminary Report on Patentability for International application No. PCT/US2008/060777 mailed Oct. 28, 2010.
International Search Report and Written Opinion of the International Searching Authority for International application No. PCT/US2008/060777 mailed Oct. 24, 2008.

* cited by examiner

*Primary Examiner* — Ula C Ruddock
*Assistant Examiner* — Matthew Van Oudenaren
(74) *Attorney, Agent, or Firm* — Carlson, Gaskey & Olds

(57) ABSTRACT

An exemplary flow field plate for use in a fuel cell includes a plurality of inlet flow channels. A plurality of outlet flow channels are also included. The flow channels are arranged such that at least two of the inlet flow channels are immediately adjacent each other on a first side of the two of the inlet flow channels. At least one of the outlet flow channels is immediately adjacent each of the two inlet flow channels on a second, opposite side of each of the two inlet flow channels.

17 Claims, 2 Drawing Sheets

FUEL CELL COMPONENT WITH INTERDIGITATED FLOW FIELDS

BACKGROUND

Fuel cells are designed to facilitate electrochemical reactions for generating electrical power. One required function in fuel cells is directing reactants in a desired manner through the fuel cell. Flow field plates typically include channels through which fluids flow during fuel cell operation. For example, a fuel gas or air is directed along flow field channels such that the gas is available at a catalyst layer of a polymer electrolyte membrane fuel cell.

Flow field channels typically have been provided on flow field plates arranged in parallel fashion. Typical flow field channel arrangements have a plurality of inlets on one side of the plate and corresponding outlets on the other side. In conventional arrangements, ribs on the flow field plate separate the individual channels.

It has also been suggested to use interdigitated flow field arrangements. These differ from conventional flow field arrangements by having a fluid enter the inlet of one channel, but exit the outlet of another channel. FIG. 1 schematically illustrates an example flow field plate arrangement 20 according to the prior art. In this example, a plurality of inlet channels 22 are arranged in parallel with a plurality of outlet channels 24. As schematically illustrated by the arrows 26, a selected fluid such as a fuel gas or air flows into the inlet channels 22 across a region including ribs 28 between the channels. The fluid flow from the inlet channels 22 to the outlet channels 24 includes approximately one-half of the flow within each inlet channel 22 transferring over to a corresponding outlet channel 24. In other words, the fluid flowing in each inlet channel is effectively diverted into two separate outlet channels 24 with approximately one-half of the flow from each inlet channel going into a corresponding outlet channel.

Example interdigitated flow field channels are described in U.S. Pat. Nos. 6,416,892; 6,472,095; 6,485,857; 6,780,533; and 6,794,077. While such arrangements provide performance enhancements, those skilled in the art are always striving to make further improvements.

SUMMARY

An exemplary flow field plate for use in a fuel cell includes a plurality of inlet flow channels. A plurality of outlet flow channels are also included. The flow channels are arranged such that at least two of the inlet flow channels are immediately adjacent each other on a first side of the two of the inlet flow channels. At least one of the outlet flow channels is immediately adjacent each of the two inlet flow channels on a second, opposite side of each of the two inlet flow channels.

An exemplary assembly for use in a fuel cell includes a flow field plate having a plurality of inlet flow channels and a plurality of outlet flow channels. The flow channels are arranged such that at least two of the inlet flow channels are immediately adjacent each other on a first side of the two of the inlet flow channels. At least one of the outlet flow channels is immediately adjacent each of the two inlet flow channels on a second, opposite side of each of the two inlet flow channels. A hydrophilic layer is included in some examples and is configured to carry moisture in at least selected regions between immediately adjacent ones of the inlet flow channels.

An exemplary method of operating a fuel cell includes directing a fluid into a plurality of inlet flow channels. The fluid from each of the inlet flow channels is transferred into a single outlet flow channel. The flow channels are arranged such that at least two of the inlet flow channels are immediately adjacent each other on a first side of the two of the inlet flow channels. At least one outlet flow channel is immediately adjacent each of the two inlet flow channels on a second, opposite side of each of the two inlet flow channels.

The various features and advantages of the disclosed example will become apparent to those skilled in the art from the following detailed description. The drawings that accompany the detailed description can be briefly described as follows.

DETAILED DESCRIPTION

Figure 2:
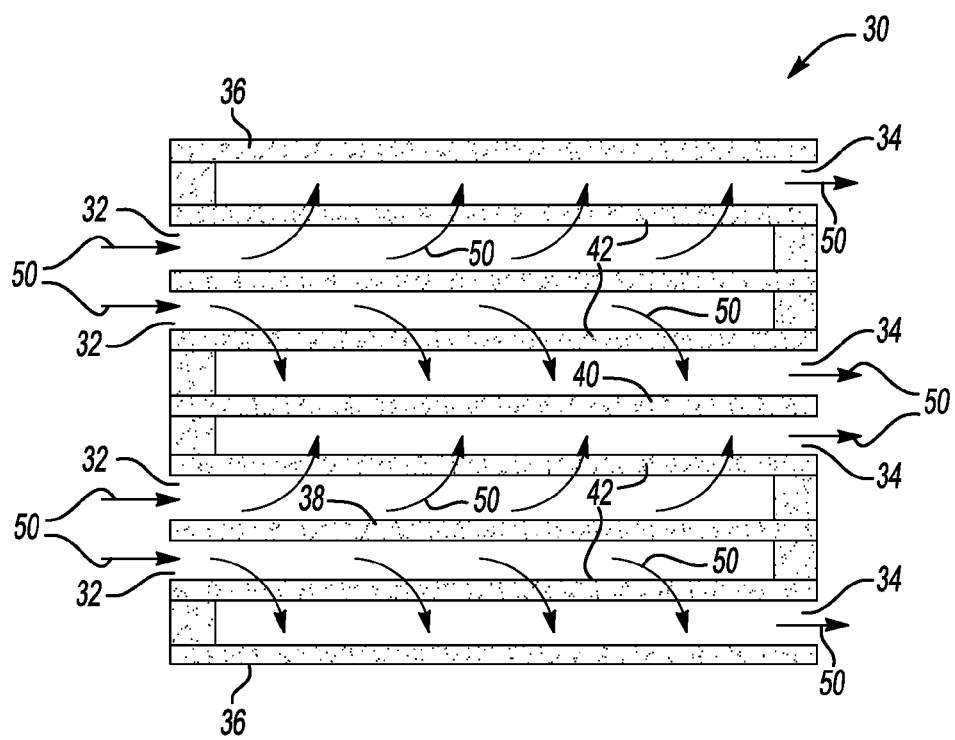
FIG. 2 schematically illustrates an interdigitated flow field arrangement designed according to an embodiment of this invention.

A flow field plate 30 for use in a fuel cell is schematically shown in FIG. 2. A plurality of inlet flow channels 32 are arranged in parallel with each other. As can be appreciated from the drawing, at least two inlet flow channels 32 are immediately adjacent each other on one side of the flow channels. At least one outlet flow channel 34 is immediately adjacent each inlet flow channel 32 on a second, opposite side of the inlet flow channels 32.

In the illustrated example, two of the outlet flow channels 34 are immediately adjacent each other without any inlet flow channels 32 between them. The inlet flow channels 32 that are immediately adjacent each other do not have any outlet flow channel 34 between them.

In the illustrated example, the flow field plate 30 includes a plurality of ribs for establishing the flow field channels. In this example, end ribs 36 establish one side of the illustrated outlet flow channels 34 that are near the lateral edges of the flow field plate 30. Ribs 38 are positioned between immediately adjacent inlet flow channels 32. A rib 40 is provided between the immediately adjacent outlet flow channels 34. Ribs 42 are provided between inlet flow channels 32 and immediately adjacent outlet flow channels 34. The ribs 42 are configured in a known manner to allow for fluid transfer from the inlet channels 32 to the outlet channels 34.

The fluid flow in the example of FIG. 2 is schematically shown by the arrows 50. As can be appreciated from the drawing, the entire flow within one of the inlet channels is transferred into only a single one of the outlet flow channels 34. This is different than previous interdigitated flow field arrangements where the flow from an inlet channel was effectively divided among two outlet flow channels. In the example of FIG. 2, each inlet flow channel 32 can be considered to have a dedicated, single outlet flow channel 34 associated with it.

Figure 1:
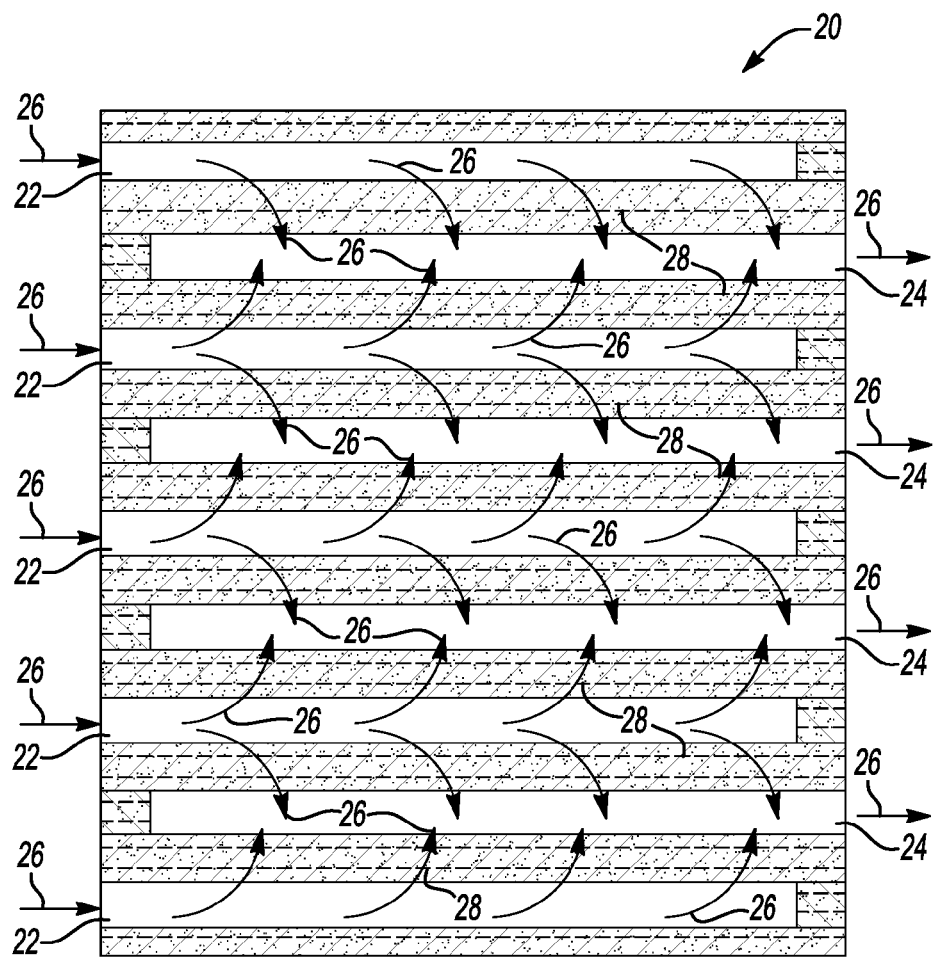
FIG. 1 schematically illustrates an interdigitated flow field arrangement according to the prior art.

The arrangement of FIG. 2 gives a higher flow rate locally through the substrate between the inlet channels 32 and the outlet channels 34 (e.g., across the regions occupied by the ribs 42). In some examples, the higher flow rate can be used to increase the gas velocity of the outlet flow channels 34 compared to previous configurations (e.g., FIG. 1). For example, the gas velocity would be higher if there are fewer outlets than inlets and multiple inlets are associated with each outlet. This can aid pushing out product water in a solid plate system, for example.

The example of FIG. 2 when considered across a lateral direction of the flow plate 30 includes a repeating pattern of two immediately adjacent inlet channels 32 followed by two immediately adjacent outlet channels 34. The example of FIG. 2 does not necessarily show the total number of flow channels that would be provided on a flow plate. At least some example channels are shown for discussion purposes. Such a repeating pattern differs from the conventional arrangements (shown in FIG. 1, for example, where the channels alternate between inlet channels and outlet channels).

In this example, a first amount of fluid transfers across the ribs between the inlet and outlet channels. A second, lower amount of fluid transfers across the ribs between lower amount of fluid transfers across the ribs between adjacent inlet channels 32. In some examples, there will not be any significant fluid transfer across the ribs between adjacent inlet channels 32. In some examples, there will be no fluid transfer across such ribs.

The flow pattern shown by the arrows 50 in FIG. 2 results in regions along the flow field plate 30 that can be considered stagnant because there is no flow rate locally through the substrate between the immediately adjacent inlet channels and between the immediately adjacent outlet channels. As can be appreciated from FIG. 3, stagnant regions 52 are schematically shown in the vicinity of the ribs 38, which are between the immediately adjacent ones of the inlet channels 32. A stagnant region 52 also exists along the vicinity of the rib 40 between the immediately adjacent outlet channels 34.

Figure 3:
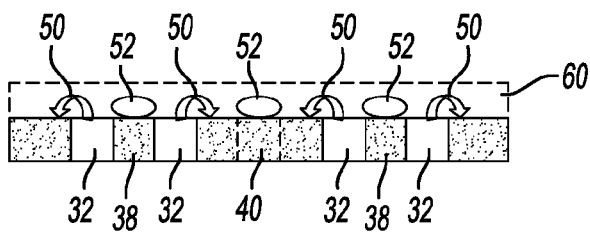
FIG. 3 schematically illustrates one example arrangement consistent with the embodiment of FIG. 2.

In one example, the stagnant regions 52 are used for wicking moisture through those regions to facilitate water distribution within a fuel cell assembly, for example. In FIG. 3, a hydrophilic layer 60, which may be adjacent the flow field plate 30, is configured for carrying moisture, for example, in a direction from the side of the plate where the outlet channels 34 exit toward the opposite side of the plate where an inlet gas is provided to the inlet channels 32. As known, dry air may be supplied to inlet channels on a cathode side of a fuel cell. Transferring moisture (i.e., product water) along the stagnant regions 52 from the outlet side, which typically includes more moist air, toward the inlet side can be useful for preventing dry out of a solid plate, for example.

In one example, the hydrophilic layer 60 is a gas diffusion layer configured for wicking or carrying moisture along the stagnant regions 52.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. An assembly for use in a fuel cell, comprising:
    a flow field plate including
        a plurality of inlet flow channels arranged in parallel with each other, the inlet flow channels being open near a first edge of the flow field plate and closed near a second, opposite edge of the flow field plate and
        a plurality of outlet flow channels arranged in parallel with each other and in parallel with the inlet flow channels, the outlet flow channels being closed near the first edge of the flow field plate and being open near the second, opposite edge of the flow field plate, the flow channels being arranged such that at least two of the inlet flow channels are immediately adjacent each other on a first side of the two of the inlet flow channels with at least one of the outlet flow channels immediately adjacent each of the two inlet flow channels on a second, opposite side of each of the two inlet flow channels; and
    a hydrophilic layer configured to carry moisture in at least selected regions between immediately adjacent ones of the inlet flow channels;
    wherein a fluid flowing in each inlet channel transfers into a single one of the immediately adjacent outlet channels.

2. The assembly of claim 1, comprising at least one rib portion between the flow channels wherein fluid flowing in each of the inlet channels transfers across a region corresponding to one of the rib portions into the single one of the outlet channels and wherein there is no fluid flow across regions corresponding to the rib portions between the immediately adjacent inlet flow channels.

3. The assembly of claim 2, wherein there is no fluid flow across regions corresponding to rib portions between immediately adjacent outlet flow channels.

4. The assembly of claim 2, wherein the hydrophilic layer is configured to carry at least some of the moisture in the regions corresponding to the rib portions between immediately adjacent inlet flow channels.

5. The assembly of claim 4, wherein the hydrophilic layer is configured to carry at least some of the moisture in the regions corresponding to the rib portions between immediately adjacent outlet flow channels.

6. The assembly of claim 1, wherein the hydrophilic layer comprises a gas diffusion layer.

7. The assembly of claim 1, wherein at least two of the outlet flow channels are immediately adjacent each other.

8. The assembly of claim 1, wherein at least some of the flow channels are arranged in a sequential pattern wherein a first one of the outlet flow channels is immediately adjacent a first one of the inlet flow channels that is immediately adjacent a second one of the inlet flow channels that is immediately adjacent a second one of the outlet flow channels that is immediately adjacent a third one of the outlet flow channels that is immediately adjacent a third one of the inlet flow channels that is immediately adjacent a fourth one of the inlet flow channels that is immediately adjacent a fourth one of the outlet flow channels.

9. An assembly for use in a fuel cell, comprising:
    a flow field plate including a plurality of inlet flow channels and a plurality of outlet flow channels, the flow channels being arranged such that at least two of the inlet flow channels are immediately adjacent each other on a first side of the two of the inlet flow channels with at least one of the outlet flow channels immediately adjacent each of the two inlet flow channels on a second, opposite side of each of the two inlet flow channels;
    a hydrophilic layer configured to carry moisture in at least selected regions between immediately adjacent ones of the inlet flow channels; and
    at least one rib portion between the flow channels wherein an entirety of fluid flowing in each of the inlet channels transfers across a region corresponding to one of the rib portions into a corresponding one of the outlet channels and wherein there is no fluid flow across regions corresponding to the rib portions between the immediately adjacent inlet flow channels.

10. The assembly of claim 9, wherein a direction of fluid flow through the inlet flow channels is the same as a direction of fluid flow through the outlet flow channels.

11. The assembly of claim 9, wherein there is no fluid flow across regions corresponding to rib portions between immediately adjacent outlet flow channels.

12. The assembly of claim 9, wherein the hydrophilic layer is configured to carry at least some of the moisture in the regions corresponding to the rib portions between immediately adjacent inlet flow channels.

13. The assembly of claim 12, wherein the hydrophilic layer is configured to carry at least some of the moisture in the regions corresponding to the rib portions between immediately adjacent outlet flow channels.

14. The assembly of claim 9, wherein the hydrophilic layer comprises a gas diffusion layer.

15. The assembly of claim 9, wherein a fluid flowing in each inlet channel transfers into a single one of the immediately adjacent outlet channels.

16. The assembly of claim 9, wherein at least two of the outlet flow channels are immediately adjacent each other.

17. The assembly of claim 9, wherein at least some of the flow channels are arranged in a sequential pattern wherein a first one of the outlet flow channels is immediately adjacent a first one of the inlet flow channels that is immediately adjacent a second one of the inlet flow channels that is immediately adjacent a second one of the outlet flow channels that is immediately adjacent a third one of the outlet flow channels that is immediately adjacent a third one of the inlet flow channels that is immediately adjacent a fourth one of the inlet flow channels that is immediately adjacent a fourth one of the outlet flow channels.

* * * * *